(No Model.)

A. J. CROSS.

SPECTACLES.

No. 304,994. Patented Sept. 9, 1884.

Witnesses,
Geo. H. Strong.

Inventor
A. J. Cross
By Dewey & Co.
Attorneys

UNITED STATES PATENT OFFICE.

ANDREW JAY CROSS, OF SAN JOSÉ, CALIFORNIA.

SPECTACLES.

SPECIFICATION forming part of Letters Patent No. 304,994, dated September 9, 1884.

Application filed March 5, 1884. (No model.)

*To all whom it may concern:*

Be it known that I, A. JAY CROSS, of San José, Santa Clara county, State of California, have invented an Improvement in Spectacles; and I hereby declare the following to be a full, clear, and exact description thereof.

My invention relates to the class of spectacles; and it consists in an improved connection or joint between the nose-piece and eye-piece or its frame, whereby the adjustment of the former may be easily and efficiently made.

Figure 1:
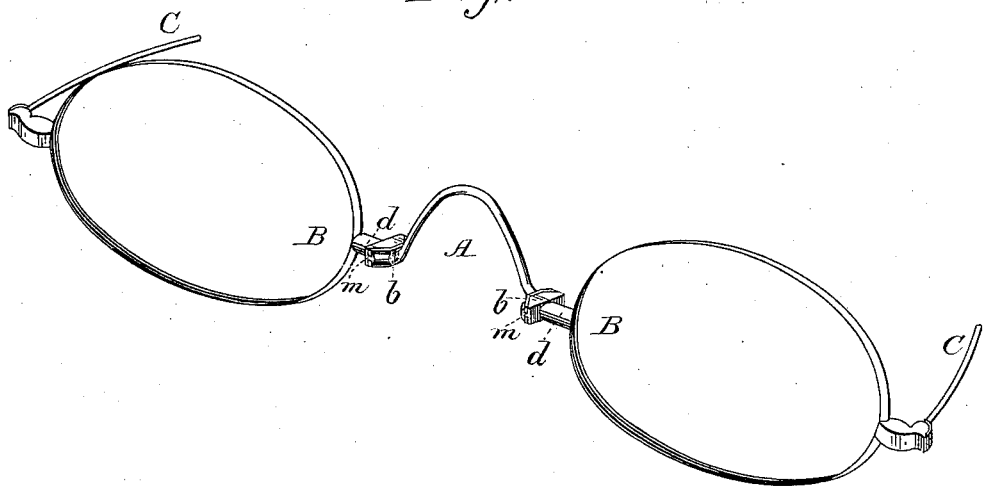
Figures 2, 3:
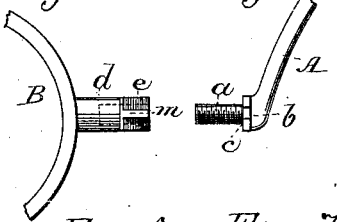
Figures 4, 5:
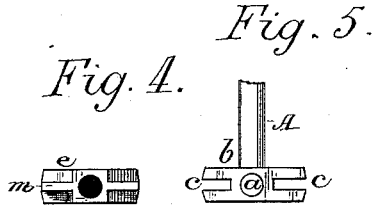
Figures 6, 7:
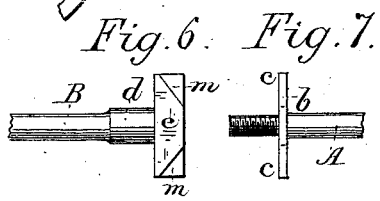
Figure 8:
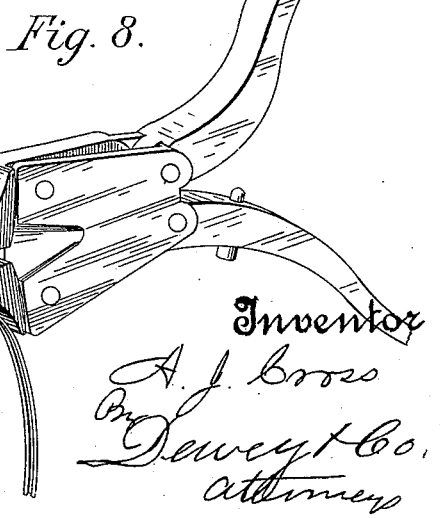
Figure 9:
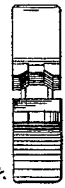

Referring to the accompanying drawings, Figure 1 is a view of a pair of spectacles, showing my invention. Fig. 2 is a front view of the stud $d$ and flange $e$ with lips $m$. Fig. 3 is a front view of the screw $a$ and collar or flange $b$. Fig. 4 is an end view of the flange $e$. Fig. 5 is an end view of the collar or flange $b$. Fig. 6 is a top view of the stud $d$ and flange $e$. Fig. 7 is a top view of the screw $a$ and collar or flange $b$. Fig. 8 shows the collar $b$ and flange $e$ brought together, resting in the jaws of the pinchers in a position to be clamped and rabbeted. Fig. 9 is an end view of the pinchers.

A is the nose-piece, of suitable size and shape. Each end of the nose-piece is provided with a screw-point, $a$, which may be made integral with said piece, or separate from it, and secured to it in any manner, as by solder. At the base of these screws are secured or formed elongated flanges or collars $b$, the ends of which are notched or slotted, forming points $c$.

B are the eye-pieces or the frames thereof, having the usual ear-wires, C. Upon the inner ends of the eye-pieces are soldered small studs $d$, hollowed out and internally threaded, forming nuts for the reception of the screws of the nose-piece. Upon the ends of these studs or nuts are formed elongated flanges $e$, the faces of which at each end are beveled backward, with the exception of the centers of said ends, which are not beveled, thus leaving small lips or lugs $m$.

To adjust the nose-piece on one side, insert its screw $a$ into the threaded stud or nut $d$ on the eye-piece, and, by turning the nose-piece, screw it up until the slotted flanges or collar $b$, at the base of the screw, abuts against the lips or lugs $m$ on the flange $e$ of the nuts. In this position the lips or lugs are directly opposite the slots in said flanges $b$. Then by the use of the pliers or pinchers, (shown in Fig. 8,) the slotted jaws of which embrace the bodies of the nose-piece and stud or nut, press or force the points $c$ of the collars $b$ against the beveled faces of the ends of the flanges $e$. These points pass on either side of the lips $m$, which thus project between them, and the pressure may be increased to flatten the edges of said lips, whereby they are headed or riveted down to make the joint perfectly secure. The other side of the nose-piece is adjusted in a similar manner. The connection obviates entirely the use of solder, and may be made very quickly. The advantage is that the proper nose-piece can be selected for the customer and adjusted on the spot.

I disclaim in this application anything shown and described which may be claimed in an application filed by me April 23, 1884, Serial No. 128,917.

Having thus described my invention, what I claim as new, and desire to secure by Letters Patent, is—

1. In a pair of spectacles, the eye pieces or frames B, having the internally-threaded studs or nuts $d$, in combination with the nose-piece A, having the screw-points $a$ on its ends adapted to fit the studs or nuts $d$, substantially as herein described.

2. In a pair of spectacles, the eye pieces or frames B, having the internally-threaded studs or nuts $d$, in combination with the nose-piece A, having the screw-points $a$ on its ends adapted to fit the studs or nuts $d$, and a means for holding the nuts on the screws to prevent the eye pieces or frames from unscrewing, substantially as herein described.

3. In a pair of spectacles, the eye pieces or frames B, and the studs or nuts $d$ upon them, in combination with the nose-piece A, having screw-points $a$, a flange on the studs, and a flange on each end of the nose-piece adapted, when the nose-piece is screwed in, to abut or meet the flanges on the studs, and a means for connecting or engaging said flanges to prevent the eye-pieces from turning or unscrewing substantially as herein described.

4. In a pair of spectacles, the eye pieces or frames B, having the internally-threaded studs or nuts $d$, in combination with the nose-piece A, having the screw-points $a$, adapted to fit the studs or nuts, and the means for securing and holding the threaded connection, consisting of the flanges $e$ on the studs, having the lips or lugs $m$, and the slotted collars or flanges $b$ on the nose-piece, having the points $c$, adapted to be bent down on each side of the lips or lugs $m$, substantially as herein described.

In witness whereof I hereunto set my hand.

ANDREW J. CROSS.

Witnesses:
S. H. NOURSE,
C. D. COLE.